No. 747,129. PATENTED DEC. 15, 1903.
J. BUCHANAN.
PLOW.
APPLICATION FILED JAN. 10, 1903.
NO MODEL.
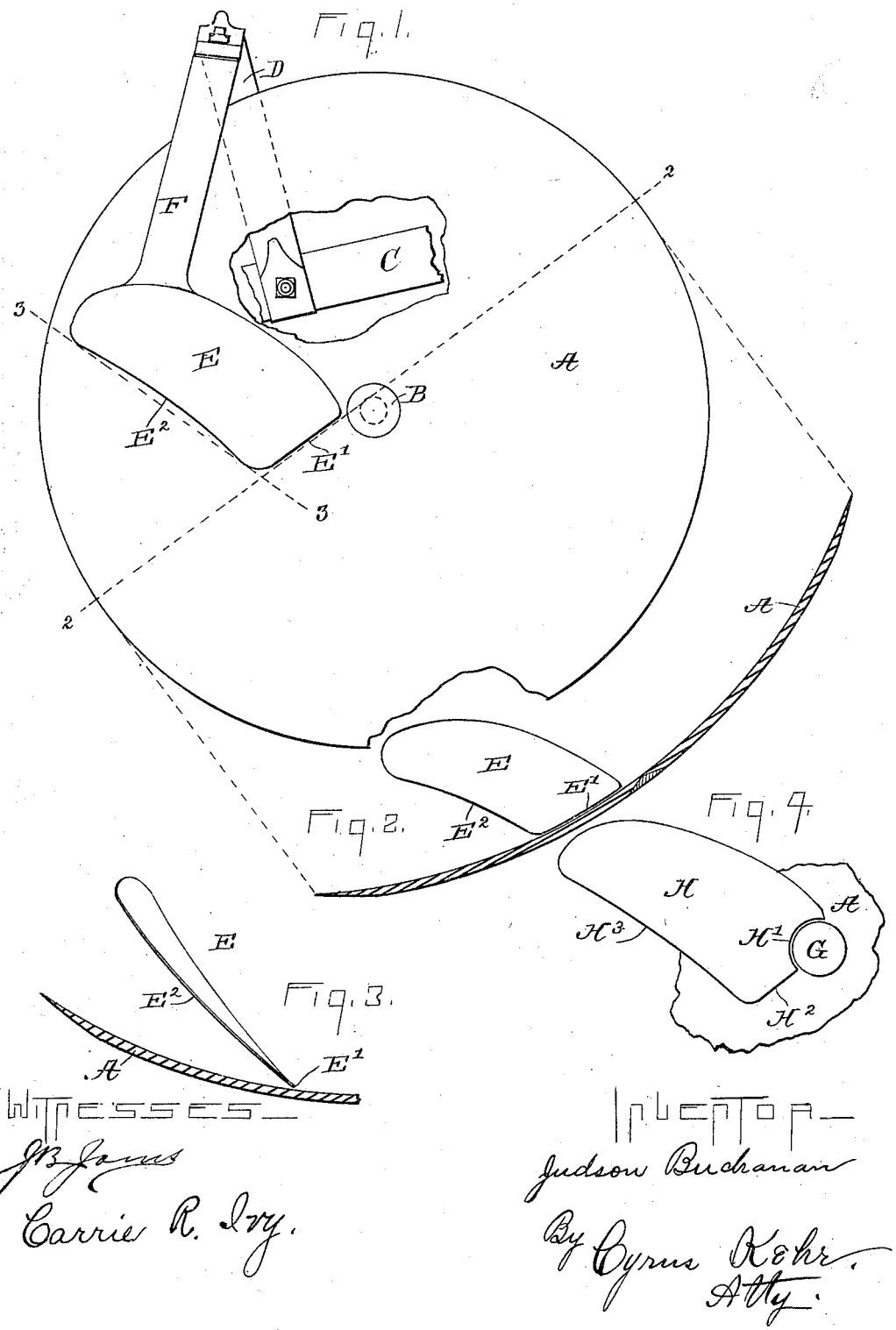

No. 747,129. Patented December 15, 1903.

UNITED STATES PATENT OFFICE.

JUDSON BUCHANAN, OF CHATTANOOGA, TENNESSEE.

PLOW.

SPECIFICATION forming part of Letters Patent No. 747,129, dated December 15, 1903.

Application filed January 10, 1903. Serial No. 138,497. (No model.)

*To all whom it may concern:*

Be it known that I, JUDSON BUCHANAN, a citizen of the United States, residing at Chattanooga, in the county of Hamilton and State of Tennessee, have invented new and useful Improvements in Plows, of which the following is a specification, reference being had to the accompanying drawings.

My invention relates to plows, and particularly to rotary-moldboard plows.

My improvement consists of the application of a jointer to the rotary disk moldboard of such a plow, the object of such improvement being to provide for the splitting of the furrow slice as it is raised by the rotary disk and turning the upper portion of said slice obliquely forward into the last preceding furrow and then turning the remainder of said slice on top of the portion already turned into the furrow to the end that all grass, weeds, and similar material lying upon the surface of the ground may be completely covered and the furrow slice completely broken up. A portion of the jointer may be so arranged as to serve as a scraper for the central portion of the disk.

In the accompanying drawings, Figure 1 is a front elevation of a disk to which my improved jointer is applied. Fig. 2 is a section on the line 2 2 of Fig. 1. Fig. 3 is a section on the line 3 3 of Fig. 1. Fig. 4 illustrates a modification.

A is the disk.

B is the usual bolt, extending axially through the disk and supporting the latter rotatably.

C is a fragment of the plow-beam or portion of the frame seen through an opening formed by breaking away a portion of the disk.

D is an arm reaching from the beam C upward above the periphery of the disk and then forward.

E is the jointer. This is located rearward of the center of the disk.

F is an arm rising from the jointer and suitably joined by its upper end to the upper end of the arm D.

The arms D and F may be joined by any suitable method, and said arms may be integral.

In Figs. 1, 2, and 3 the jointer is provided with a forward edge E', which bears so closely against the face of the disk A as to serve as a scraper edge for the central portion of the disk. From said edge rearward the jointer extends bodily away from the face of the disk, so that the lower edge $E^2$ of the jointer forms with said disk an angle approximately as shown in Fig. 3, whereby said edge $E^2$ will extend diagonally over a cross-section made at this point through the furrow slice in order that the upward movement of the furrow slice will involve the diagonal splitting or cutting of said slice by said edge $E^2$. The upper portion of the jointer is preferably somewhat inclined forward, so as to facilitate the turning or inversion of the upper portion of the furrow slice after such portion has been severed. Not only does the edge E' of the jointer serve as a scraper when said edge is made to bear against the disk, but the clogging of the jointer with grass, weeds, and cornstalks is thereby prevented, for when the forward end of the jointer bears against the disk said end of the jointer is masked by the disk, and grass, weeds, and cornstalks cannot engage with said edge.

In the modification illustrated by Fig. 4 the bolt G has a projecting head instead of a flat countersunk head, as in Fig. 1, and the jointer H has a notch H', into which said head H extends. By this means said bolt is made to aid in sustaining the jointer and to serve as a mask to deflect grass, weeds, and similar material sufficient to insure passage over the adjacent edge of the jointer without engaging the latter. Below the notch H' said jointer H has the scraper $H^2$, similar to the edge E' in the other figures, and the lower edge $H^3$ of the scraper H is a cutting edge similar to the edge $E^2$ of the other figures, the body of the scraper H being inclined to the disk as the body of the scraper E is in the other figures.

Practical use has proven the utility of this jointer or combined jointer and scraper. Grass, weeds, and similar material are put into the bottom of the furrow and loose earth on top more efficiently than with any other apparatus which I know.

I claim as my invention—

1. In a rotary-moldboard plow, the combination with a rotary moldboard-disk, of a jointer located rearward of the forward half of the disk and having the rear portion of its lower edge set away from the disk, substantially as and for the purpose described.

2. In a rotary-moldboard plow, the combination with a rotary moldboard-disk, of a jointer having its forward end extending to said disk and having its lower edge extending from said forward end gradually rearward and outward away from the disk, substantially as and for the purpose described.

3. In a rotary-moldboard plow, the combination with a rotary moldboard-disk, of a jointer having its forward end extending to and partially around the bolt-head at the axis of said disk and extending from said forward end gradually rearward and outward away from the disk at a suitable angle to adapt it to cut the furrow slice diagonally.

4. In a rotary-moldboard plow, the combination with a rotary moldboard-disk, of a jointer having its forward end extending to and partially around the bolt-head at the axis of said disk and having below said bolt-head an edge extending to said disk, and said jointer extending from said edge and bolt gradually rearward and outward away from the disk at a suitable angle to adapt it to cut the furrow slice diagonally.

In testimony whereof I have signed my name, in presence of two witnesses, this 7th day of January, 1903.

JUDSON BUCHANAN.

Witnesses:
C. F. MINTURN,
HOWARD MITCHELL.